May 16, 1967   H. T. ROBINSON   3,319,370
SLIDE TRAY INDEXING MECHANISM
Original Filed Feb. 23, 1962   2 Sheets-Sheet 1
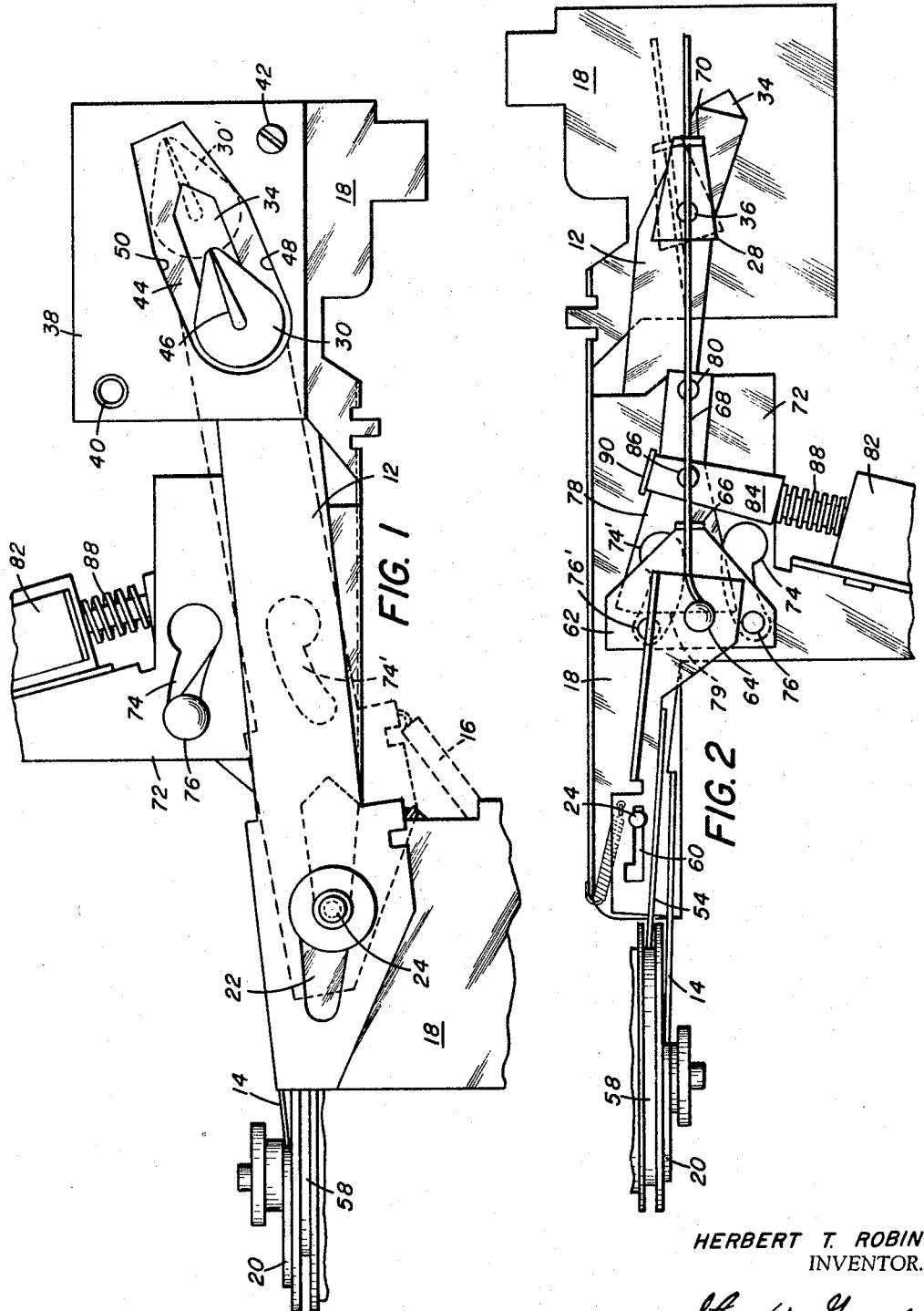
HERBERT T. ROBINSON
INVENTOR.
BY *Steve W. Grambow*
*Robert W. Hampton*
ATTORNEYS

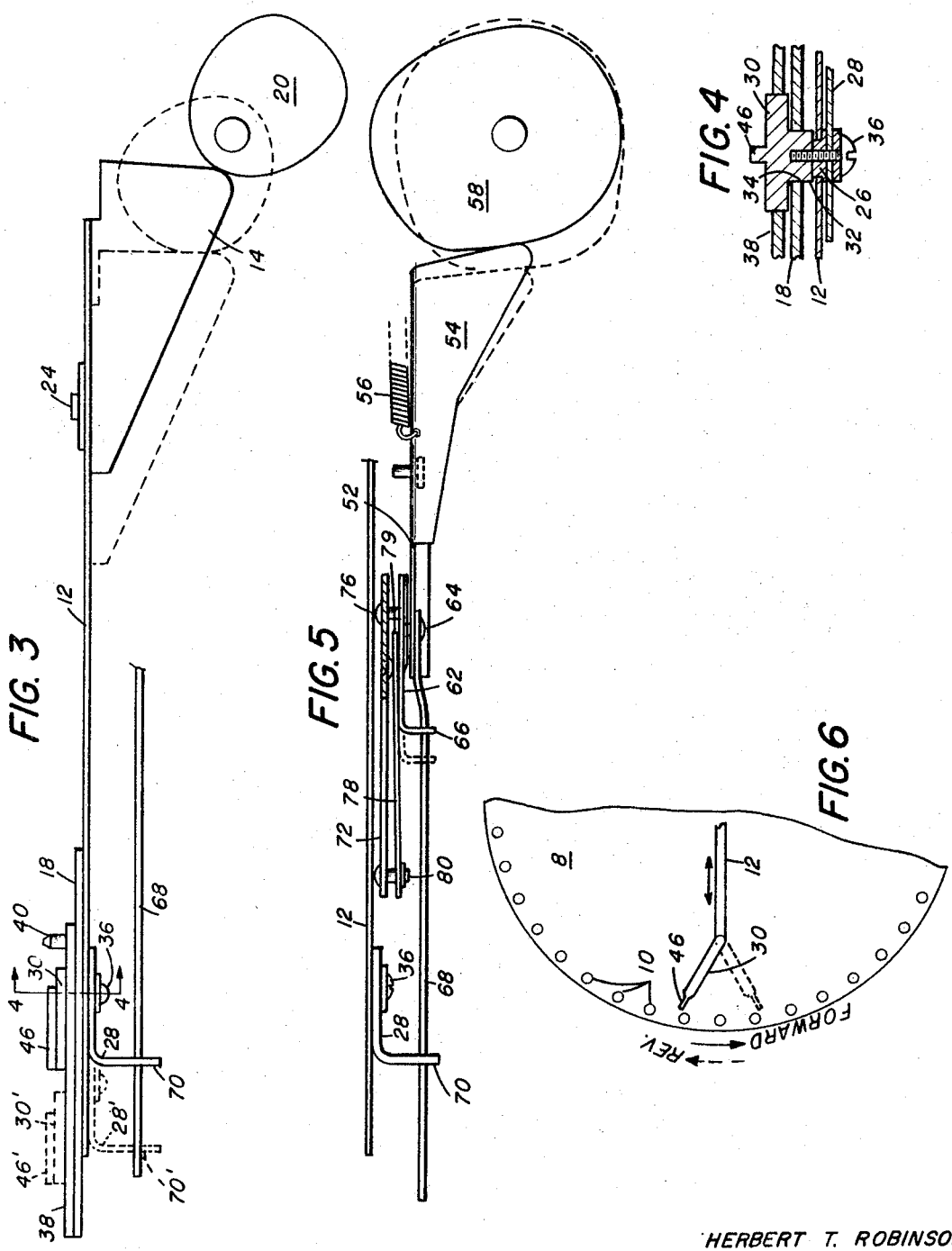

United States Patent Office 3,319,370
Patented May 16, 1967

3,319,370
SLIDE TRAY INDEXING MECHANISM
Herbert T. Robinson, Rochester, N.Y., assignor to Eastman Kodak Company, Rochester, N.Y., a corporation of New Jersey
Application June 1, 1965, Ser. No. 460,017, now Patent No. 3,276,314, dated Oct. 4, 1966, which is a division of application Ser. No. 175,216, Feb. 23, 1962, now Patent No. 3,276,156, dated Oct. 4, 1966. Divided and this application Aug. 4, 1966, Ser. No. 570,205
6 Claims. (Cl. 40—79)

This application is a division of U.S. patent application Ser. No. 460,017, for an Automatic Slide Projector, filed on June 1, 1965, by Herbert T. Robinson, now Patent No. 3,276,314, issued Oct. 4, 1966, which is a division of U.S. patent application Ser. No. 175,216 for an Automatic Slide Projector, filed on Feb. 23, 1962, by Herbert T. Robinson, now Patent No. 3,276,156, issued Oct. 4, 1966.

This invention relates generally to slide projectors, and more specifically to an improved slide tray indexing mechanism for moving a slide tray in forward and reverse directions.

This invention includes within its scope an improved slide tray indexing mechanism comprising an indexing pawl movable in one direction, and means for moving the pawl between forward and reverse positions in which the pawl is positioned so that it is transverse to said one direction. As the pawl is moved in its one direction, the tray is indexed in forward or reverse directions depending upon which position the pawl is in. The pawl is normally in its forward position, and means are provided to move it to its reverse position when desired.

One of the objects of the present invention is to provide an improved slide tray indexing mechanism for moving a slide tray in forward and reverse directions.

Another object of the invention is to provide an improved slide tray indexing mechanism that is of simple design and construction, thoroughly reliable and efficient in operation, and economical to manufacture.

Objects and advantages other than those set forth above will be apparent from the following description when read in connection with the accompanying drawings, in which:

FIG. 1 is a top plan view of the slide indexing mechanism of this invention;

FIG. 2 is a bottom view of the slide indexing mechanism of FIG. 1;

FIG. 3 is a side elevation view of the slide tray indexing mechanism showing its normal non-indexing position in full lines and its indexing position in dotted lines;

FIG. 4 is a section view taken along 4—4 of FIG. 3;

FIG. 5 is a side elevation view of the indexing direction control mechanism with the remaining structure omitted for purposes of clarity, and further showing its normal inoperative position in full lines and its operative position in dotted lines; and FIG. 6 is a schematic view of the tray indexing mechanism showing in full lines the indexing pawl in the forward indexing position, and in dotted lines, the indexing pawl in the reverse indexing position.

Referring to the drawings, a preferred embodiment of a slide tray indexing mechanism according to the present invention is disclosed for use in an automatic slide projector of the type shown and described in the aforementioned U.S. patent applications of the same inventor. Applicant has limited his drawings to the inventive features involved, and many parts of the slide projector ancillary thereto, and which are shown and described in the aforementioned applications, have been omitted for purposes of clarity.

As is well known in the slide projector art and as described in the parent applications, a magazine 8, only a portion of which is shown in FIG. 6, is manually or automatically cyclically indexed in the forward or reverse direction by incremental distances corresponding to the spacing of successive slide tray compartments in the magazine. A slide changing cycle of the projector generally comprises returning a slide, if any, from its viewing position to its tray compartment, indexing the tray an incremental distance corresponding to one slide tray compartment, and permitting the next slide to be transported into the viewing position. The slide tray has spaced indexing pins 10 depending therefrom as seen in FIG. 6, and the projector is normally provided with a slide tray positioning mechanism, not shown, comprising a projection which is adapted to be selectively moved into the spaces between the pins to block or prevent movement of the slide tray in either direction, and further to position the slide tray with one of its slide compartments in alignment with a slide gate. When the projection is withdrawn free or clear of the pins, the slide tray may be freely indexed in a forward or reverse direction.

The slide tray indexing mechanism comprises a plate 12 having a bent tab 14 whose edge forms a cam follower as best seen in FIG. 3. A spring 16 interposed between a lug on plate 12 and support frame 18 as seen dotted in FIG. 1 urges cam follower into engagement with the periphery of a cam 20. The plate 12 has an elongated slot 22 through which a post 24 on frame 18 extends. A steel washer, not shown, is interposed between frame 18 and plate 12 to provide a relatively frictionless surface for the sliding movement of plate 12. The opposite end of plate 12 has an opening for receiving a bearing 26 as seen in FIG. 4. An L-shaped arm 28 is disposed on one side of bearing 26, and a plastic pawl 30 on the opposite side having a cylindrical portion 32 extending through an elongated slot 34 (see FIG. 1) in support frame 18. The arm 28 and pawl 30 are secured together by means of a screw 36 for pivotal movement of arm 28, bearing 26 and pawl 30 as a unit in opening 34.

A plate 38 is pivoted about the base of a pin 40 on frame 18, and is adjustably secured to frame 18 by a screw 42 as seen in FIG. 1. The plate 38 further has an elongated slot 44 whose sides form cam surfaces for pawl 30. The pawl 30 has a narrow pointed rib 46 which is adapted to cooperate with pins 10 on slide tray 8 for indexing the slide tray in a forward or reverse direction as seen in FIG. 6 upon forward movement of plate 12 by cam 20.

With pawl 30 following a cam surface 48 of slot 44, forward movement of plate 12 by cam 20 will cause rib 46 to enter the space between two adjacent pins 10 of slide tray 8 and to cam the slide tray in a forward indexing direction as seen in full lines in FIG. 6. On the other hand, with pawl 30 following a cam surface 50 of slot 44, forward movement of plate 12 and pawl 30 will cause rib 46 to enter the space between two pins 10 and cam the slide tray 8 in the opposite or reverse indexing direction as seen dotted in FIG. 6. By adjusting plate 38, it is possible to locate the cam surfaces 48, 50 so that rib 46 will accurately enter the space between adjacent pins 10. The rib 46 and the aforementioned positioning projection not shown operate in proper timed relation so that during any cycle of operation at least one of them is in position to block inadvertent manual movement of the movable portion of the slide tray 8 to prevent jamming.

The mechanism for positioning pawl 30 in a forward or reverse indexing position will now be described. This pawl positioning mechanism comprises a lever 52 having a depending tab 54 whose edge forms a cam follower. A spring 56 interconnects lever 52 with frame 18 for urging the cam follower edge 54 into engagement with the periphery of a cam 58. The lever 52 further has an elongated slot 60 (see FIG. 2) through which the post extends for guiding lever 52 for reciprocal movement. The opposite end of lever 52 pivotally supports a plate 62 on a stud 64. The plate 62 has a lug 66 having a notch for receiving a spring wire 68, one end of the wire being secured to stud 64 and the opposite end extending through an opening in a bent end 70 of arm 28. The frame 18 has a laterally extending portion 72 having a pair of spaced apart, arcuate slots 74, 74' as best seen in FIG. 1. The plate 62 has a pair of laterally extending pins 76, 76' extending through respective slots 74, 74' (see FIG. 2).

A fan-shaped blocking plate 78 interposed between plate 62 and frame portion 72 as viewed in FIG. 2 has one end pivotally mounted on a stud 80 carried by frame 72, and a solenoid 82 mounted on frame portion 72 has an arm 84 secured to plate 78 by a rivet 86. A helical spring 88 encircling arm 84 is interposed between a shoulder on arm 84 and solenoid 82 for moving arm 84 and plate 78 in one direction until the end of arm 84 engages a stop lug 90. In this initial position, the front end 79 of plate 78 is positioned in front of pin 76', but is out of the path of pin 76 as seen in FIG. 2. Accordingly, upon forward movement of lever 52 by cam 58 from a normal position as seen in full lines in FIG. 5, pin 76' will initially engage end 79 of plate 78 and will act as a pivot for plate 62. Upon further movement of lever 52, plate 62 will pivot about pin 76' as pin 76 moves along slot 74. As plate 62 is pivoted, lug 66 moves wire 68 into the position seen dotted in FIG. 2 which, in turn, moves arm 28 causing pawl 30 to move into engagement with cam surface 48. In this position pawl 30 is in a forward indexing position. As plate 12, which is moved in timed relation with lever 52, reaches one end of its travel as seen in dotted lines in FIG. 3, the tray is indexed in a forward direction. Lever 52 is returned by its spring 56 to its retracted position as seen in full lines in FIG. 5 causing spring 68 and plate 62 to return to its initial position.

To move pawl 30 into a reverse indexing position, solenoid 82 is energized pivoting plate 78 and withdrawing its end 79 from the path of pin 76' and positioning it in the path of pin 76. Consequently, upon forward movement of lever 52 by cam 58 from its normal position, the pin 76 initially engages plate end 79 and acts as a pivot for plate 62 while pin 76' moves along slot 74'. Pivoting plate 62 in this clockwise direction as viewed in FIG. 2 causes lug 66 to move spring wire 68 and arm 28 in a clockwise direction causing pawl 30 to engage cam surface 50. In this position, pawl 30 is in a reverse indexing position. Once again, as plate 12 reaches the end of its travel as seen dotted in FIG. 3 indexing tray 8 in a reverse direction, lever 52 is moved by its spring 56 to its retracted position causing spring 68 and plate 62 to return to its initial position.

The invention has been described in detail with particular reference to a preferred embodiment thereof, but it will be understood that variations and modifications can be effected in the scope of the invention as described hereinabove and as defined in the appended claims.

I claim:

1. In an indexing mechanism for a slide projector for indexing a slide tray one step at a time in forward and reverse directions, the combination comprising:

a pawl;

means for reciprocally moving said pawl into and out of engagement with said slide tray;

said pawl further being pivotally movable between a normal forward position, in which said pawl indexes said slide tray in a forward direction when it is moved into engagement therewith, and a reverse position, in which said pawl indexes said slide tray in a reverse direction when moved into engagement therewith;

control means for selectively moving said pawl into one of said forward and reverse positions;

said control means comprising a spring element connected to said pawl, and means directly connected to said spring element for moving said spring element.

2. The invention according to claim 1 wherein said spring element moving means comprises a pivotal member connected to said spring element.

3. The invention according to claim 1 wherein said spring element moving means comprises a pivotal member connected to said spring element, and a reciprocally movable member supporting said pivotal member, said spring element comprises a wire having one end connected to said reciprocally movable member and its opposite end connected to said pawl, and said pivotal member is connected to said wire intermediate its ends.

4. The invention according to claim 1 wherein said spring element moving means comprises a pivotal member connected to said spring element, and a reciprocally movable member supporting said pivotal member, said spring element comprises a wire having one end connected to said reciprocally movable member and its opposite end connected to said pawl, said pivotal member is connected to said wire intermediate its ends, said control means further comprises a blocking member for said pivotal member and movable between first and second positions, and means on said pivotal member adapted upon movement of said reciprocally movable member to cooperate with said blocking member in each of said first and second positions pivoting said pivotal member in one of two opposite directions.

5. The invention according to claim 1 wherein said spring element moving means comprises a pivotal member connected to said spring element, and a reciprocally movable member supporting said pivotal member, said spring element comprises a wire having one end connected to said reciprocally movable member and its opposite end connected to said pawl, said pivotal member is connected to said wire intermediate its ends, said control means further comprises a blocking member for said pivotal member said blocking member being movable between first and second positions, and means on said pivotal member adapted upon movement of said reciprocally movable member to cooperate with said blocking member in each of said first and second positions pivoting said pivotal member in one of two opposite directions, said means on said pivotal member comprising spaced apart projections, and said blocking member blocks one of said projections in one of said first and second positions, and the other projection in the other of said first and second positions.

6. The invention according to claim 1 wherein said spring element moving means comprises a pivotal member connected to said spring element, and a reciprocally movable member supporting said pivotal member, said spring element comprises a wire having one end connected to said reciprocally movable member and its opposite end connected to said pawl, said pivotal member is connected to said wire intermediate its ends, said control means further comprises a blocking member for said pivotal member, said blocking member being pivotally movable between first and second positions, and means on said pivotal member adapted upon movement of said reciprocally movable member to cooperate with said blocking member in each of said first and second positions pivoting said pivotal member in one of two opposite directions, said means on said pivotal member comprising spaced apart projections, and said blocking member has an end portion for selectively blocking one of said projections in one of said first and second positions, and the other projection and the other of said first and second positions, and said element moving means further comprises a second spring for biasing said blocking member in one of said first and second positions, and a solenoid for moving said blocking member in the other of said first and second blocking positions against the bias of said second spring.

References Cited by the Examiner

UNITED STATES PATENTS

| | | | |
|---|---|---|---|
| 3,059,360 | 10/1962 | Krauskopf | 40—79 |
| 3,173,331 | 3/1965 | Danner | 40—79 X |
| 3,192,657 | 7/1965 | Mulch | 40—79 |

EUGENE R. CAPOZIO, *Primary Examiner.*

W. GRIEB, *Assistant Examiner.*